(12) United States Patent
Takehara

(10) Patent No.: US 9,986,115 B2
(45) Date of Patent: May 29, 2018

(54) DISPLAY DEVICE

(71) Applicant: SEIKO EPSON CORPORATION, Tokyo (JP)

(72) Inventor: Katsuhiro Takehara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 49 days.

(21) Appl. No.: 15/060,254

(22) Filed: Mar. 3, 2016

(65) Prior Publication Data

US 2016/0266708 A1 Sep. 15, 2016

(30) Foreign Application Priority Data

Mar. 13, 2015 (JP) .................................. 2015-050516
Mar. 13, 2015 (JP) .................................. 2015-050517

(51) Int. Cl.
*H04N 1/00* (2006.01)
*G06F 3/0488* (2013.01)

(52) U.S. Cl.
CPC ..... *H04N 1/00519* (2013.01); *G06F 3/04886* (2013.01); *H04N 1/00411* (2013.01); *G06F 2203/04809* (2013.01)

(58) Field of Classification Search
CPC ...... G06F 3/04886; G06F 2203/04809; H04N 1/00411
See application file for complete search history.

(56) References Cited

U.S. PATENT DOCUMENTS

| 5,572,573 | A | * | 11/1996 | Sylvan | H04M 1/0266 341/23 |
| 6,003,052 | A | * | 12/1999 | Yamagata | G06F 1/1626 345/905 |
| 6,009,338 | A | * | 12/1999 | Iwata | H04M 1/0214 379/433.04 |
| 7,403,191 | B2 | * | 7/2008 | Sinclair | G06F 3/0224 345/168 |
| 9,010,912 | B2 | * | 4/2015 | Ichimura | B41J 2/16505 347/7 |
| 2003/0098803 | A1 | * | 5/2003 | Gourgey | G06F 3/04886 341/21 |
| 2003/0235452 | A1 | * | 12/2003 | Kraus | B41J 5/102 400/472 |
| 2011/0184824 | A1 | * | 7/2011 | George | G01D 5/39 705/24 |
| 2011/0216015 | A1 | * | 9/2011 | Edwards | G06F 3/041 345/173 |
| 2011/0260976 | A1 | * | 10/2011 | Larsen | G06F 3/04886 345/168 |
| 2013/0208193 | A1 | * | 8/2013 | Wyllie | G09F 19/02 348/836 |
| 2014/0145967 | A1 | * | 5/2014 | Edwards | G06F 1/1628 345/173 |

FOREIGN PATENT DOCUMENTS

JP 2012-168869 9/2012

\* cited by examiner

*Primary Examiner* — Mihir K Rayan
(74) *Attorney, Agent, or Firm* — Workman Nydegger

(57) ABSTRACT

A display device includes a screen, a touch sensor for detecting a contact position of an operation element on the screen, and an input auxiliary device capable of being moved by sliding by a user between a position above the screen and a standby position beyond the screen.

10 Claims, 5 Drawing Sheets

DISPLAY DEVICE

CROSS REFERENCES TO RELATED APPLICATIONS

The entire disclosure of Japanese Patent Application 2015-050516, filed Mar. 13, 2015 is incorporated by reference herein. The entire disclosure of Japanese Patent Application 2015-050517, filed Mar. 13, 2015 is incorporated by reference herein.

BACKGROUND

1. Technical Field

The present invention relates to display devices.

2. Related Art

Some portable terminals are provided with a detachable cover section attached to a touch panel. Keys provided on the cover section are pressed to operate the touch panel (for example, JP-A-2012-168869).

However, after the cover section is detached, the detached cover section can be easily lost. Further, the cover section may not be readily attached to the touch panel.

SUMMARY

An advantage of some aspect of the invention is to provide a technique for readily placing an input auxiliary device above a screen without the possibility of losing the input auxiliary device.

A display device according to an aspect of the invention includes a screen, a touch sensor for detecting a contact position of an operation element on the screen, an input auxiliary device capable of being moved by sliding between a position above the screen and a standby position beyond the screen, and a controller for performing key display on the screen, and receiving an input operation corresponding to the key display. Note that the term "contact" may also means a condition in which the operation element coming in close proximity to the screen without actually making contact with the screen.

In the above-described structure, the user can perform the input operation corresponding to the key display by sliding the input auxiliary device to the position above the screen and bringing the operation element into contact with the position on the screen corresponding to the position of the input auxiliary device. On the other hand, if an input operation corresponding to the key display is not performed, the user can visually check the screen without interruption by the input auxiliary device by sliding the input auxiliary device to the standby position beyond the screen. Since the input auxiliary device can be moved by sliding, the user can readily place the input auxiliary device at the position above the screen without losing the input auxiliary device. Further, the contact position on the screen for receiving an input operation corresponding to the key display is a position corresponding to the position of the input auxiliary device detected by the detector. Consequently, the user is not required to accurately adjust the position to which the input auxiliary device is to be moved by sliding. Note that the term "sliding" means a movement of the input auxiliary device in a direction parallel or substantially parallel to the screen. The movement may be rectilinear motion, rotational motion, or various types of curvilinear motion on a plane parallel to the screen.

The controller may set a position of the key display on the screen to a position independent of the position of the input auxiliary device detected by the detector. In other words, while the contact position of the operation element on the screen for receiving an input operation depends on the position of the input auxiliary device detected by the detector, a position of the key display on the screen does not depend on the position of the input auxiliary device detected by the detector. This operation allows the position of the key display on the screen to remain at a constant position and enables the user to readily and visually check the key display. In such a case, if the input auxiliary device blocks the user's view and the user cannot visually check a part of the screen, it is expected that the user will slide the input auxiliary device to a position where the user can readily and visually check the key display without being blocked by the input auxiliary device. As described above, it is possible to prevent a situation in which the user's view is partially blocked by the input auxiliary device because the position of the key display is moved according to the actual position of the input auxiliary device despite the user's operation of sliding the input auxiliary device to the position where the user can readily view the key display.

Further, the detector may detect a position of the input auxiliary device based on the contact position of the operation element detected by the touch sensor. The position of the input auxiliary device can be detected by the touch sensor. Consequently, it is not necessary to separately provide a detector for detecting the position of the input auxiliary device.

A position detection mechanism that comes into contact with the screen may be provided in the input auxiliary device. The detector may detect a position of the input auxiliary device based on a contact position of the position detection mechanism detected by the touch sensor. Also in this structure, the position of the input auxiliary device can be detected by the touch sensor. Consequently, it is not necessary to separately provide a detector for detecting the position of the input auxiliary device.

Alternatively, the detector may detect a position of the input auxiliary device based on a detection result of a detector for detecting a position of the input auxiliary device. That is, it is not always necessary to detect a position of the input auxiliary device by the touch sensor, and alternatively, the position may be detected by a sensor other than the touch sensor.

The detector may be provided on a rail on which the input auxiliary device slides during the sliding movement. As described above, the detector provided on the rail on which the input auxiliary device slides enables accurate detection of a slide position of the input auxiliary device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
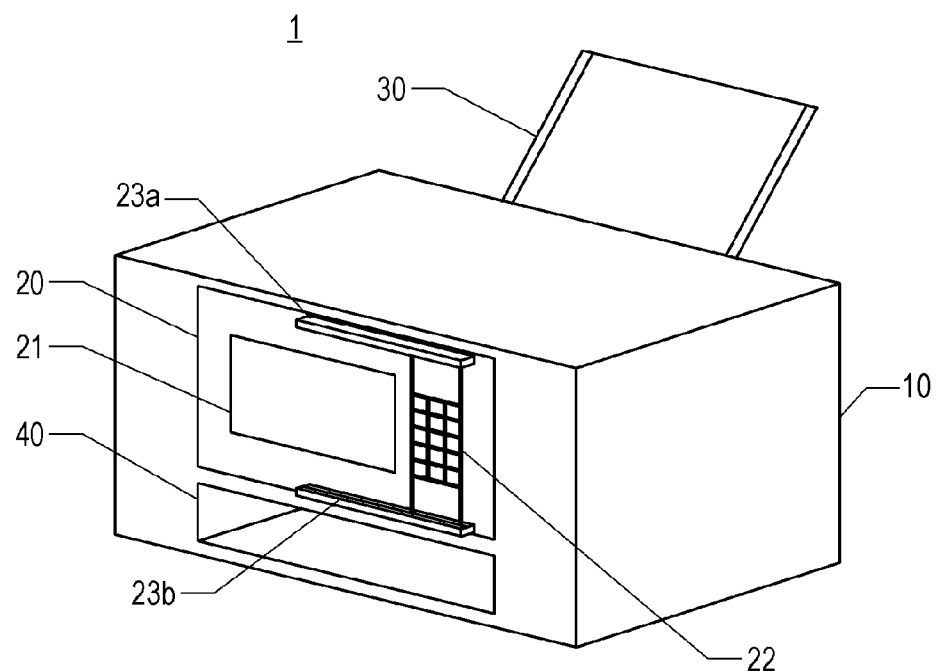
FIG. 1A is a perspective view of a printer.

Hereinafter, embodiments of the invention will be described in the following order with reference to the attached drawings. In the drawings, the same reference numerals are applied to corresponding components, and overlapping descriptions thereof are omitted.
1. Device construction
2. Input operation reception processing
3. Other exemplary embodiments
1. Device Construction FIG. 1A is a perspective view of a printer 1 including a display device according to a first embodiment of the invention. The printer 1 includes, as an outward structure, a body housing 10, an operation section 20, a sheet feed tray 30, and a discharge tray 40. The operation section 20 is provided on a side surface (front surface) of the body housing 10. The operation section 20 may be provided on the top surface of the body housing 10, or may be tiltably connected to the body housing 10. The operation section 20 includes a touch panel display 21, an input auxiliary device 22, and rails 23a and 23b.

The touch panel display 21 includes a liquid crystal display (LCD), which serves as a screen, and a touch sensor. The touch sensor detects a contact position of an operation element (may also be referred to as "contact member", "contact portion", or the like) to the LCD. For example, the operation element may be a tip of a finger or a stylus pen. The printer 1 performs printing onto a print medium that has been loaded on the sheet feed tray 30 and discharges the printed medium onto the discharge tray 40. It is not always necessary to provide the display device according to the embodiment of the invention on the printer 1, and alternatively, the display device may be provided on any apparatus that receives an input operation from a user via the screen.

Figure 1B:
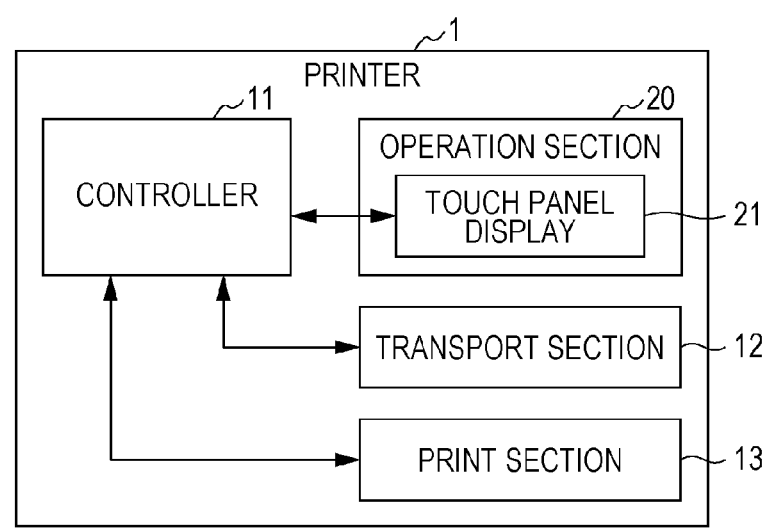
FIG. 1B is a block diagram of the printer.

FIG. 1B is a block diagram of a functional configuration of the printer 1. The body housing 10 of the printer 1 includes a controller 11, a transport section 12, and a print section 13, which are enclosed in the body housing 10. The controller 11 is a computer that includes a processor, a memory, and an input/output interface. The controller 11 executes a print program to control the transport section 12, the print section 13, and an operation section 20.

The transport section 12 is hardware for transporting a print medium from the sheet feed tray 30 to the print section 13 and for further transporting the printed medium from the print section 13 to the discharge tray 40. The transport section 12 is controlled by the controller 11. Specifically, the transport section 12 includes a transport roller such as a pickup roller, a drive motor for driving the transport roller, a control circuit for controlling the drive motor, and the like.

The print section 13 is hardware for performing printing onto a print medium. The print section 13 is controlled by the controller 11. Specifically, the controller 11 includes a print head, a drive motor for driving the print head, a control circuit for controlling the print head and the drive motor, and the like.

Figure 2A:
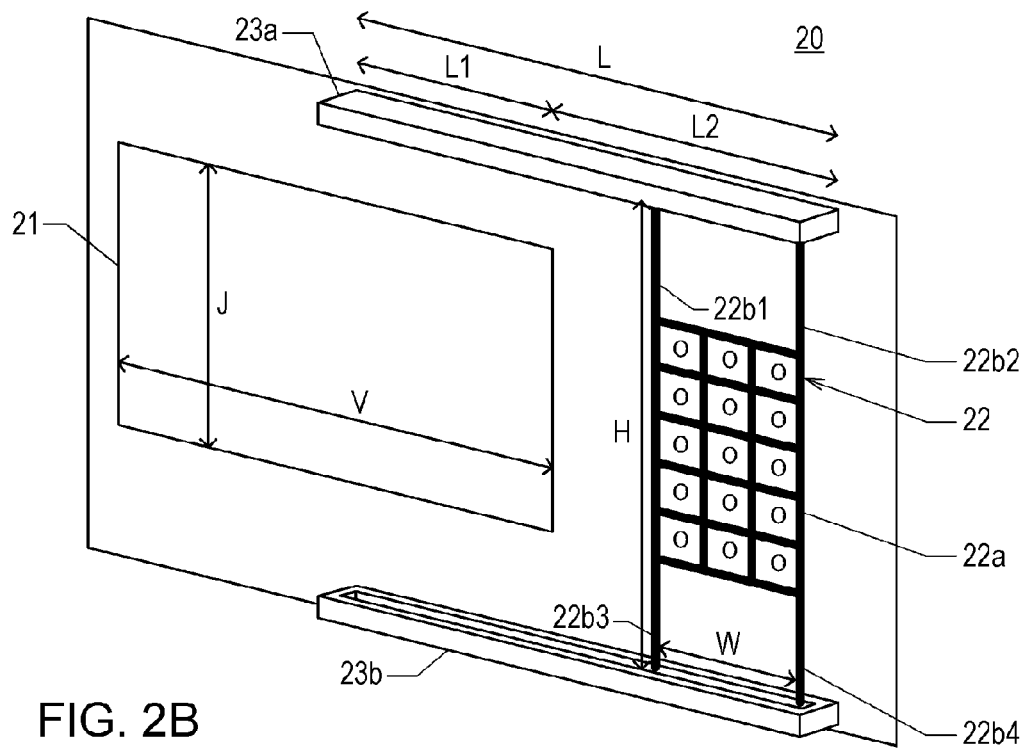
FIG. 2A is a perspective view of an operation section.

FIG. 2A is a perspective view of the operation section 20. As shown in FIG. 2A, a touch panel display 21 is rectangular in shape and the straight rails 23a and 23b are provided along the upper and lower sides of the touch panel display 21, respectively. A length H of the input auxiliary device 22 in a longitudinal direction is longer than a length J of the touch panel display 21 in the longitudinal direction, and a width W in a lateral direction is shorter than a width V of the touch panel display 21 in the lateral direction.

The input auxiliary device 22 includes a lattice section 22a and four connection sections 22b1 to 22b4. The length H of the input auxiliary device 22 in the longitudinal direction is longer than the length J of the touch panel display 21 in the longitudinal direction. The lattice section 22a has rectangular openings O arranged in a matrix shape (for example, 5 rows and 3 columns), and the lattice section 22a has an orthogonal grid shape. The connection sections 22b1 to 22b4 are straight sections extending longitudinally from four corners of the lattice section 22a respectively. The connection sections 22b1 to 22b4 connect the lattice section 22a with the rails 23a and 23b. The connection sections 22b1 to 22b4 hold the lattice section 22a at approximately the same height as the touch panel display 21.

The upper rail 23a and lower rail 23b are parallel with each other and have the same length L. In the rails 23a and 23b, in the lateral direction, a length L1 of a portion overlapping the touch panel display 21 is longer than the width W of the input auxiliary device 22. In the lateral direction, a length L2 of a portion not overlapping the touch panel display 21 is also longer than the width W of the input auxiliary device 22. The length H of the input auxiliary device 22 in the longitudinal direction is substantially equal to the length of a space between the rails 23a and 23b in the longitudinal direction.

Figure 2B:
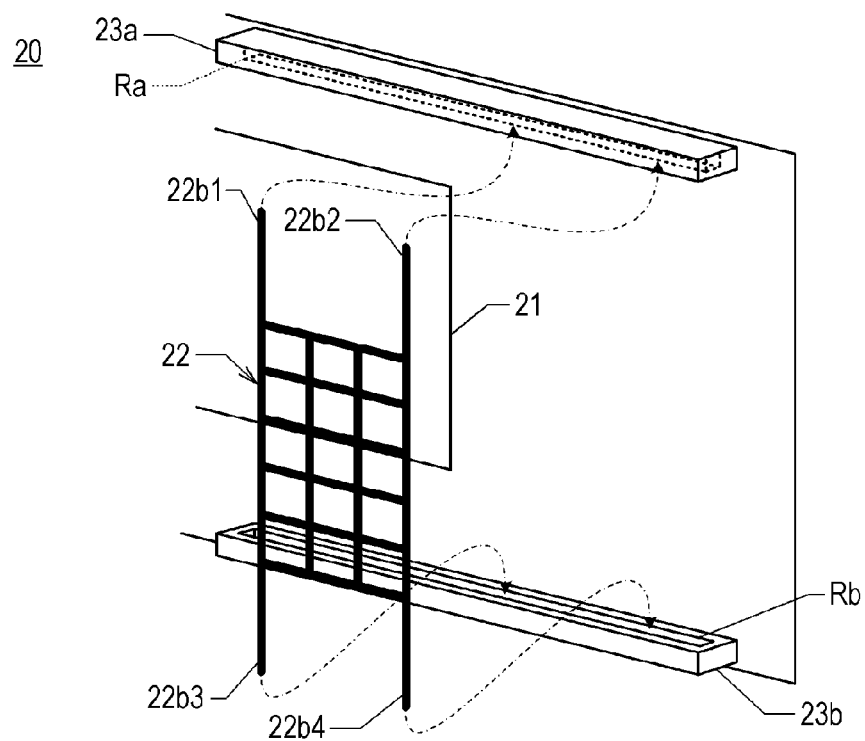
FIG. 2B is an exploded perspective view of the operation section.

FIG. 2B is an exploded perspective view of the operation section 20. The upper rail 23a has a groove Ra that opens downward, and the rail 23a has a u-shaped cross section. The lower rail 23b is symmetrical with the upper rail 23a, and the rail 23b has a groove Rb that opens upward. Into the groove Ra of the upper rail 23a, upper ends of the two connection sections 22b1 and 22b2 extending upward from the lattice section 22a are inserted. Into the groove Rb of the lower rail 23b, lower ends of the two connection sections 22b3 and 22b4 extending downward from the lattice section 22a are inserted. The grooves Ra and Rb do not extend to both ends of the rails 23a and 23b in the width direction. That is, the grooves Ra and Rb are not open in the width direction.

Here, a use position is defined as a position at which the input auxiliary device 22 is moved by sliding to the left-hand ends of the rails 23a and 23b, and a standby position is defined as a position at which the input auxiliary device 22 is moved by sliding to the right-hand ends of the rails 23a and 23b. The use position is a position where the whole lattice section 22a of the input auxiliary device 22 is placed above the touch panel display 21. The standby position is a position where the whole lattice section 22a of the input auxiliary device 22 is placed beyond the touch panel display 21.

By the above-described configuration, a user can slide the input auxiliary device 22 along the rails 23a and 23b to slide the input auxiliary device 22 in the width direction within the range of the length L of the rails 23a and 23b. In other words, the input auxiliary device 22 is configured such that the user can slide the input auxiliary device 22 between the use position above the touch panel display 21 and the standby position beyond the touch panel display 21. The input auxiliary device 22 does not drop off the rails 23a and 23b because the grooves Ra and Rb do not open at both ends of the rails 23a and 23b in the width direction.

2. Input Operation Reception Processing

Figure 3:
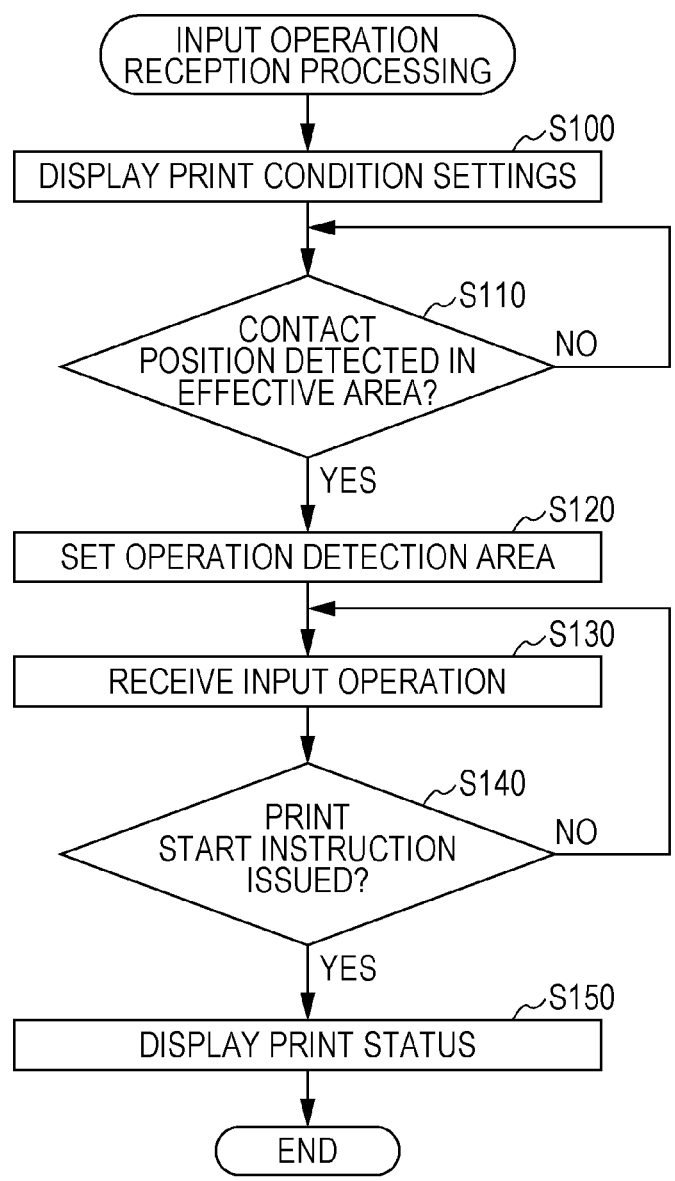
FIG. 3 is a flowchart of input operation reception processing.

FIG. 3 is a flowchart of input operation reception processing. The input operation reception processing is performed by the controller 11 to receive various input operations for the printer 1. In this embodiment, as an example, a series of input operations for setting print conditions is received through the input operation reception processing. First, the controller 11 instructs the touch panel display 21 to display a print condition setting display (step S100). Specifically, the controller 11 generates image data corresponding to the print condition setting display and outputs the image data to the touch panel display 21.

Figure 4A:
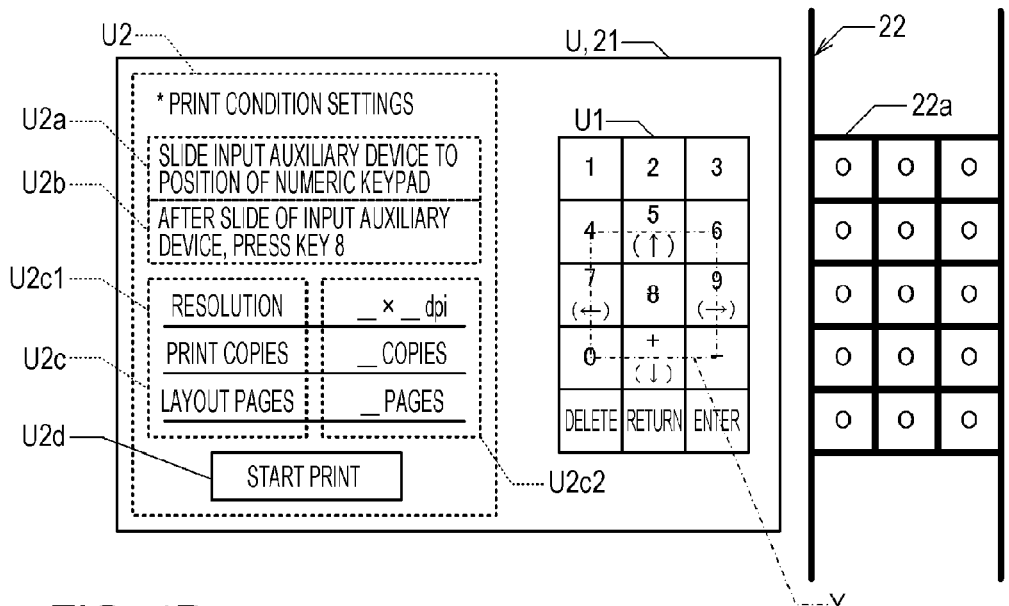
FIG. 4A shows print condition setting display.

FIG. 4A shows an example of a print condition setting display U. The print condition setting display U includes a key display section U1 and a setting item display section U2. The key display section U1 provides a key display that shows a numeric keypad. On the key display section U1, images corresponding to keys of the numeric keypad are displayed respectively such that the images have the same sizes and arrangements as the openings O in the input auxiliary device 22. The setting item display section U2 includes a first notification section U2a for displaying a message stating "Slide input auxiliary device to position of numeric keypad", and a second notification section U2b for displaying a message stating "After sliding input auxiliary device, press key 8". The setting item display section U2 further includes an item section U2c for each setting item. The item section U2c includes a name section U2c1 for displaying a name of a setting item, and a content section U2c2 for displaying a current setting content. Further, the setting item display section U2 includes a print start button U2d.

After the controller 11 instructs the touch panel display 21 to display the above-described print condition setting display U, the controller 11 determines whether a contact position has been detected within a predetermined effective area Y on the touch panel display 21 (step S110). The effective area Y includes an area of the display of the key 8 in the key display section U1, and an area within a predetermined distance from the key display area (for example, half the length of the side of one key display) (the area indicated by the dashed-dotted line in FIG. 4A). The input auxiliary device 22 has been moved above the key display section U1 by sliding, and in such a state, to press the image of the key 8 at the center (the third row and the second line) of the key display section U1, an operation element such as a finger comes into contact with the touch panel display 21 through the opening O at the center (the third row and the second line) of the input auxiliary device 22 (lattice section 22a).

If no contact position is detected within the effective area Y (step S110: N), the controller 11 continuously determines whether a contact position has been detected within the effective area Y. If a contact position has been detected within the effective area Y (step S110: Y), the controller 11 sets an operation detection area based on the contact position detected within the effective area Y (step S120). There is no point in detecting a temporary contact, for example, contact of the input auxiliary device 22 while the input auxiliary device 22 is being moved by sliding, so if the controller 11 detects contact for a predetermined time period at a position, the controller 11 determines that the contact position is to be a detected contact position. The contact position detected within the effective area Y corresponds to the central position of the input auxiliary device 22 detected by the touch sensor. In other words, the controller 11, which serves as a detector, detects a central position T of the input auxiliary device 22 based on the contact position of the operation element detected by the touch sensor.

Figure 4B:
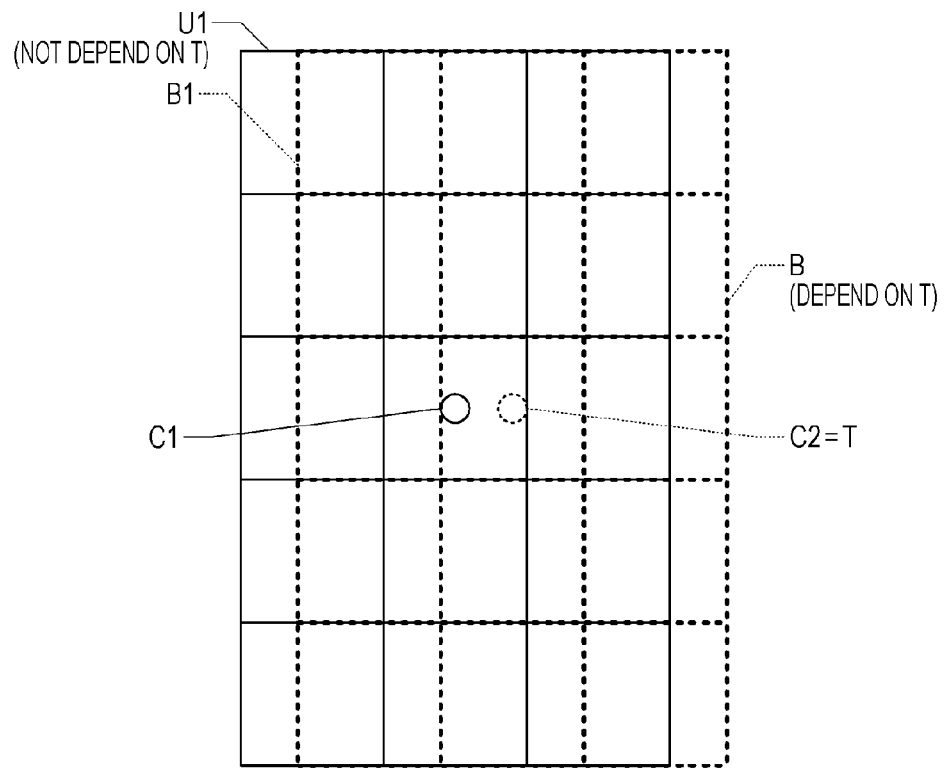
FIG. 4B shows a relationship between a key display section and an operation detection area.

FIG. 4B shows a relationship between the key display section U1 and an operation detection area B. The operation detection area B includes key areas B1 for receiving an operation corresponding to each key display in the key display section U1. The size and arrangement of the key area B1 is the same as each key display in the key display section U1. A central position C1 (white circle with solid line) of the key display section U1, however, does not correspond to a central position C2 (white circle with broken line) of the operation detection area B. The controller 11 sets the operation detection area B such that the central position C2 of the operation detection area B corresponds to the central position T of the input auxiliary device 22 detected by the touch sensor in step S110. As described above, the operation detection area B can be set at a position on the touch panel display 21, the position corresponding to the central position T of the input auxiliary device.

If the central position T of the input auxiliary device 22 is not detected for the predetermined period of time, the controller 11 may set the operation detection area B such that the central position C2 of the operation detection area B corresponds to the central position C1 of the key display section U1. Alternatively, if the central position T of the input auxiliary device 22 is not detected for a predetermined period of time, the controller 11 may instruct the touch panel display 21 to display a message urging a user to slide the input auxiliary device 22. The controller 11 may not always detect the central position T as a position of the input auxiliary device 22, but may detect a position of an end or corner of the input auxiliary device 22. Further, the controller 11 may detect two or more positions of the input auxiliary device 22.

After the operation detection area B is set, the controller 11 receives an input operation to the key display section U1 (step S130). Specifically, if a contact position of an operation element is detected within the area in which the item section U2c of the setting item display section U2 has been displayed, the controller 11 receives an input operation for specifying setting content shown by the content section U2c2 of the item section U2c. In other words, the controller 11 receives an input operation corresponding to the key display if a contact position of an operation element such as a finger detected by the touch sensor is a position (operation detection area B) on the touch panel display 21 corresponding to the central position T of the input auxiliary device 22 detected by the touch sensor. The input operation may be an operation for entering a number corresponding to the key display in the key display section U1. For example, the number of print copies, or the like may be specified by entering a number corresponding to the key display in the key display section U1. The input operation may be an operation for inputting a cursor movement direction of up, down, left, or right assigned to the key display of the keys 8, 2, 4, and 6 respectively in the key display section U1. For example, a desired print resolution, or the like may be specified by the upward, downward, left, or right cursor movement from a list of print resolutions provided in advance.

Next, the controller 11 determines whether a print start instruction has been issued (step S140). Specifically, if a contact position of an operation element is detected within the area the print start button U2d has been displayed, the controller 11 determines that a print start instruction has been issued. If the controller 11 determines that no print start instruction has been issued (step S140: N), the controller 11 continuously waits for an input instruction to the key display section U1.

On the other hand, if the controller 11 determines that a print start instruction has been issued (step S140: Y), the controller 11 instructs the touch panel display 21 to display a print status display (step S150). That is, while the controller 11 erases the print condition setting display U including the key display section U1 from the touch panel display 21, instructs the touch panel display 21 to display a print status display. This print status display includes a part for displaying a message "Slide input auxiliary device to original position (standby position)". During the processes from step S100 to step S140, the controller 11 keeps the key display section U1 at a constant position. That is, the controller 11 allows the position of the key display section U1 to be independent of the central position T of the input auxiliary device detected by the touch sensor.

In the above-described structure, the user can perform an input operation corresponding to the key display by sliding the input auxiliary device 22 to the position above the touch panel display 21, and bringing an operation element to come into contact with a position above the touch panel display 21 corresponding to the position of the input auxiliary device 22. On the other hand, if the user does not perform an input operation corresponding to the key display, the user can slide the input auxiliary device 22 to the standby position beyond the touch panel display 21 to visually check the touch panel display 21 (print status display, or the like) without being interrupted by the input auxiliary device 22. Since the input auxiliary device 22 can be moved by sliding, the user can readily set the input auxiliary device 22 at the position above the touch panel display 21 without missing the input auxiliary device 22. Further, the contact position (operation detection area B) on the touch panel display 21 for receiving an input operation corresponding to the key display is a position corresponding to the central position T of the input auxiliary device 22 detected by the touch sensor. Consequently, the user is not required to accurately adjust the position to which the input auxiliary device 22 is to be moved by sliding.

Further, the user is not always looking at the touch panel display 21 from the front. For this reason, the controller 11 may allow the position of the key display section U1 on the touch panel display 21 to be independent of the position of the input auxiliary device 22 detected by the touch sensor. This operation allows the key display section U1 on the touch panel display 21 to remain at a predetermined position, and enables the user to readily visually check the key display section U1. If the user is looking at the touch panel display 21 from a slanting direction, unfortunately, the input auxiliary device 22 may block the user's view, and in such a case, the user may not visually check a part of the touch panel display 21. In such a case, it is expected that the user slides the input auxiliary device 22 to a position (a position each key display can be readily viewed through the openings O from the user's viewpoint) the user can readily and visually check the key display section U1 without being blocked by the input auxiliary device 22. As described above, it is possible to prevent a situation in which the user's view is partially blocked by the key display section U1 because the position of the key display section U1 is moved according to the actual position of the input auxiliary device 22 despite the user's operation of sliding the input auxiliary device 22 to the position where the user can readily view the key display section U1.

Further, the central position T of the input auxiliary device 22 is detected based on the contact position of the operation element detected by the touch sensor, which serves as a detector. Consequently, it is not necessary to separately provide a detector for detecting the position of the input auxiliary device 22.

3. Other Exemplary Embodiments

It is to be understood that the technical scope of the invention is not limited by the above-described embodiments. Various modifications and addition can be made without departing from the scope of the invention including combinations of the above-described embodiments. The display device according to the embodiments of the invention may be embedded in devices other than the printer 1.

It is not always necessary to provide the standby position on the right of the touch panel display 21, and alternatively, the standby position may be provided on the left, the top, or the bottom of the touch panel display 21. Further, a structure other than the structure in which an operation element, for example a finger, comes into contact with the touch panel display 21 through the opening O provided in the input auxiliary device 22 may be employed. For example, the input auxiliary device 22 may be configured to have a protrusion as an operation element for each key display on the touch panel display 21 side of the input auxiliary device 22 such that the protrusion can be pressed toward the touch panel display 21 side. For example, the input auxiliary device 22 may include hardware keys such as a numeric keypad. A key top of the hardware key may be pressed to allow the protrusion corresponding to the hardware key to come into contact with the touch panel display 21 side.

The controller 11 is not always required to set the position of the key display section U1 to a position independent of the detected central position T of the input auxiliary device 22. For example, the controller 11 may set the position of the key display section U1 to a position depending on the detected central position T of the input auxiliary device 22. Alternatively, the controller 11 may set the position of the key display section U1 to the same position as the operation detection area B set based on the central position T.

A position detection mechanism that comes into contact with the touch panel display 21 may be provided in the input auxiliary device 22. The controller 11, which serves as a detector, may detect a position of the input auxiliary device 22 based on a contact position of the position detection mechanism detected by the touch sensor. The input auxiliary device 22 may be a device not for the display of the numeric keypad, or may be a device not for a plurality of key displays. For example, the input auxiliary device 22 may be a device corresponding to each direction of a direction key, or a component for operating a single key display. Further, the input auxiliary device 22 may be a device not for pressing a key display, but for guiding an operation of flicking a key display in a specific direction.

Figure 5A:
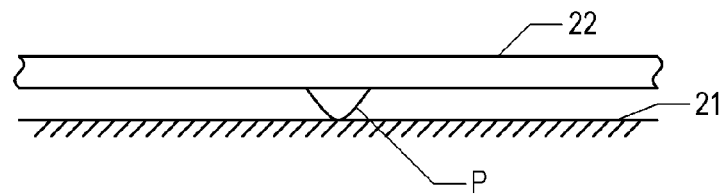
FIG. 5A is a side view of an input auxiliary device according to another embodiment.

FIG. 5A shows an input auxiliary device 22 according to another embodiment viewed from a direction parallel with the touch panel display 21. As illustrated in FIG. 5A, the input auxiliary device 22 includes a position detection mechanism P that protrudes toward the touch panel display 21. The input auxiliary device 22 is moved by sliding above the touch panel display 21, and the position detection mechanism P comes into contact with the touch panel display 21. This contact enables the touch sensor to detect the contact position of the position detection mechanism P. Also in this structure, the position of the input auxiliary device 22 can be detected by the touch sensor. Consequently, it is not necessary to separately provide a detector for detecting the position of the input auxiliary device 22.

Alternatively, the controller 11, which serves as a detector, may detect a position of the input auxiliary device 22 based on a detection result of a detector for detecting a position of the input auxiliary device 22. That is, it is not always necessary to detect a position of the input auxiliary device 22 by the touch sensor, and alternatively, the position may be detected by a sensor other than the touch sensor. Specifically, the detector may be provided on the rail 23a or 23b on which the input auxiliary device 22 slides during the sliding movement. For example, a photointerrupter, which emits light and the light is to be blocked by the upper end of the connection section 22b1, may be provided at a plurality of positions on the upper rail 23a in the length direction, and thereby a detector may be provided. For example, the upper end of the other connection section 22b2 may be formed of a transparent material to enable the controller 11 to uniquely detect a position of the upper end of the connection section 22b1. The detector may be an element that changes its electrical state in response to a contact of the upper end of the connection section 22b1, or an element that changes its mechanical state in response to a contact of the upper end of the connection section 22b1. The detector may be provided on the lower rail 23b.

Figure 5B:
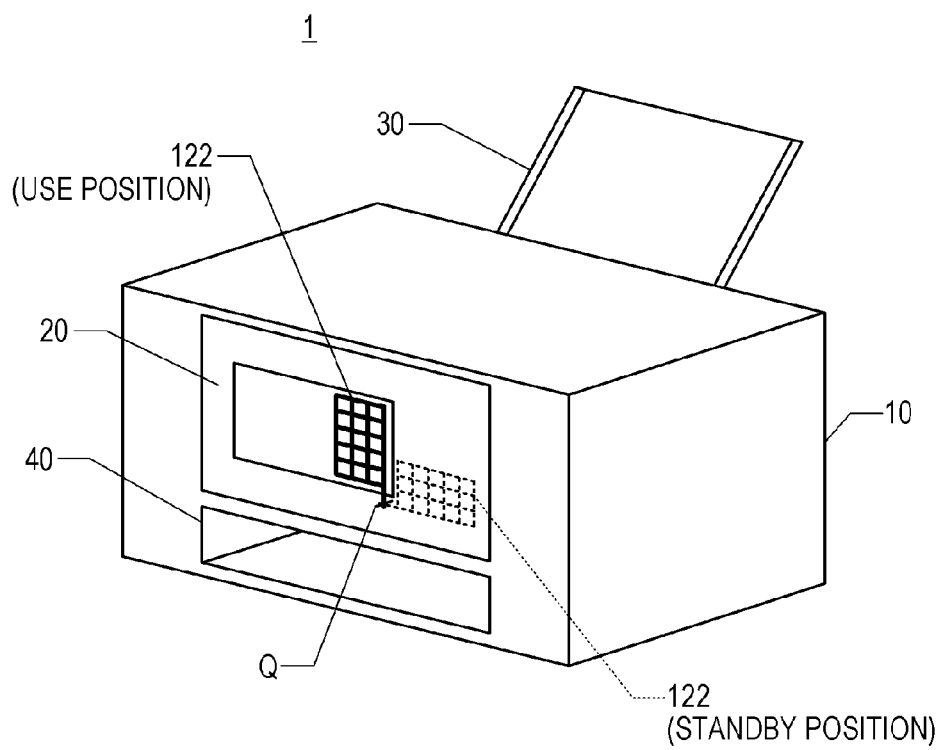
FIG. 5B is a perspective view of a printer according to yet another embodiment.

FIG. 5B shows an input auxiliary device 22 according to yet another embodiment. As illustrated in FIG. 5B, an input auxiliary device 122 rotates around a rotational axis Q that is orthogonal to the touch panel display 21, and thereby the input auxiliary device 122 can slide between a use position and a standby position. As described above, the rotation of the input auxiliary device 122 may enable the input auxiliary device 22 to slide in parallel with the touch panel display 21. It is not always necessary that the input auxiliary device 22 is disposed in the plate like state at the standby position, and alternatively, the input auxiliary device 22 may be wound and housed at the standby position or may be folded and housed. The input auxiliary device 22 may be partially automated. For example, the input auxiliary device 22 may be moved by sliding from the standby position to the use position with a motor at the timing to display the key display section U1 on the touch panel display 21, and the input auxiliary device 22 may be moved by sliding from the use position to the standby position with the motor at the timing to erase the key display section U1 from the touch panel display 21. The input auxiliary device 22 may be configured such that at the use position, the user may adjust the position by shifting the input auxiliary device 22. A motor may be used to detect a position of the input auxiliary device 22 by measuring an amount of electric power generated by the motor in adjusting the position by shifting the position of the input auxiliary device 22 by the user.

A mechanism for the user to readily place the input auxiliary device 22 may be provided. For example, an elastic member that stretches in a direction perpendicular to the touch panel display 21 may be provided at an upper end of each of the connection sections 22b1 and 22b2, and the upper ends of the connection sections 22b1 and 22b2 may be inserted into the rail 23a in a state the elastic members are compressed. In a part of the rail 23a, recessed portions for allowing the elastic members to restore may be provided to enable the input auxiliary device 22 to be placed in a state the upper ends of the connection sections 22b1 and 22b2 are positioned at the recessed portions. The recessed portion may be formed such that at least the input auxiliary device 22 can be placed at the use position. The lower connection sections 22b3 and 22b4 may be placed on the lower rail 23b.

A cover for hiding the input auxiliary device 22 at the standby position may be provided. For the touch panel, various types of touch panels may be employed, for example, a resistive film type, a surface-acoustic-wave type, or the like may be employed. Various methods for determining that a pointer such as a finger touches the screen when the pointer comes close to the screen without actual contact onto the screen, for example, a capacitive type or an infrared type may be employed. Further, the display device is not limited to the printer, and alternatively, various devices such as a scanner, a cellular phone, or an automatic teller machine (ATM) may be used.

What is claimed is:

1. A display device comprising:
   a screen;
   a touch sensor for detecting a contact position of an operation element on the screen;
   an input auxiliary device capable of being moved by sliding between a position above the screen and a standby position beyond the screen;
   a detector for detecting a position of the input auxiliary device; and
   a controller for performing key display on the screen and receiving an input operation corresponding to the key display, wherein the controller sets an operation detection area B such that a central position C2 of the operation detection area B corresponds to a central position T of the input auxiliary device detected by the touch sensor, and wherein the operation detection area B can be set at a position on a touch panel display that corresponds to the central position T of the input auxiliary device;
   wherein the input auxiliary device defines an operation detection area, and operation of the key display can be performed even if the operation detection area is misaligned relative to the key display, and wherein the controller receives the input operation corresponding to the key display and the position of the input auxiliary device if the contact position of the operation element is the position on the screen corresponding to the position of the input auxiliary device.

2. The display device according to claim 1, wherein the controller sets the position of the key display on the screen to a position independent of the position of the input auxiliary device detected by the detector.

3. The display device according to claim 1, wherein the detector detects the position of the input auxiliary device based on the contact position of the operation element detected by the touch sensor.

4. The display device according to claim 1, wherein the input auxiliary device is provided with a position detection mechanism configured to come into contact with the screen, and
   wherein the detector detects the position of the input auxiliary device based on a contact position of the position detection mechanism detected by the touch sensor.

5. The display device according to claim 1, further comprising:
   a detector provided on a rail on which the input auxiliary device slides during the slide operation of the input auxiliary device,
   wherein the detector provided on the rail detects the slide position of the input auxiliary device.

6. The display device according to claim 1, further comprising:
   a motor for sliding the input auxiliary device between the position on the screen and the standby position beyond the screen.

7. The display device according to claim 6, further comprising:

a detector for detecting the position of the input auxiliary device based on the movement of the motor, wherein the controller performs key display on the screen and receives the input operation corresponding to the key display and the position of the input auxiliary device if the contact position of the operation element detected by the touch sensor is on the screen corresponding to the position of the input auxiliary device.

8. The display device according to claim 1, wherein the key display is in a fixed location on the screen.

9. A printer, comprising:
the display device according to claim 1;
an upper rail disposed near an upper edge of the screen; and
a lower rail disposed near a lower edge of the screen, wherein the input auxiliary device is configured and arranged to move laterally, relative to the screen, along the upper rail and the lower rail.

10. A printer, comprising:
a body housing; and
the display device according to claim 1, the input auxiliary device of the display device being mounted to the body housing.

* * * * *